(12) United States Patent
Cheng

(10) Patent No.: US 10,113,594 B2
(45) Date of Patent: Oct. 30, 2018

(54) SAFETY DEVICE FOR CURTAIN CONTROLLER

(71) Applicant: CHEN TIAN CO., LTD., Tainan (TW)

(72) Inventor: Ching-Hsiang Cheng, Tainan (TW)

(73) Assignee: Chen Tian Co., Ltd., Tainan (TW)

( * ) Notice: Subject to any disclaimer, the term of this patent is extended or adjusted under 35 U.S.C. 154(b) by 71 days.

(21) Appl. No.: 15/355,531

(22) Filed: Nov. 18, 2016

(65) Prior Publication Data

US 2018/0017110 A1 Jan. 18, 2018

(30) Foreign Application Priority Data

Jul. 15, 2016 (TW) .............................. 105122364 A

(51) Int. Cl.
| | |
|---|---|
| *F16D 9/00* | (2006.01) |
| *A47H 5/02* | (2006.01) |
| *E06B 9/326* | (2006.01) |
| *F16H 7/08* | (2006.01) |
| *F16H 55/30* | (2006.01) |
| *F16H 57/031* | (2012.01) |
| *F16H 57/035* | (2012.01) |

(52) U.S. Cl.
CPC ................ *F16D 9/00* (2013.01); *A47H 5/02* (2013.01); *E06B 9/326* (2013.01); *F16H 7/0827* (2013.01); *F16H 55/30* (2013.01); *F16H 57/031* (2013.01); *F16H 57/035* (2013.01); *E06B 2009/3265* (2013.01)

(58) Field of Classification Search
CPC ... E06B 9/40; E06B 9/42; E06B 9/324; E06B 9/361; E06B 9/364; E06B 2009/3225; E06B 2009/3265; E06B 2009/585; E06B 2009/785; E06B 9/50; F16D 9/00; A47H 5/02
USPC .............................................. 160/321, 323.1
See application file for complete search history.

(56) References Cited

U.S. PATENT DOCUMENTS

| | | | | |
|---|---|---|---|---|
| 5,092,389 A | * | 3/1992 | Tedeschi ................... | E06B 9/78 160/321 |
| 5,222,541 A | * | 6/1993 | Hornberger ............... | E06B 9/13 160/190 |
| 6,116,325 A | * | 9/2000 | Colson ...................... | E06B 9/32 160/321 |
| 6,540,004 B2 | * | 4/2003 | Wu ........................... | E06B 9/50 160/321 |

(Continued)

FOREIGN PATENT DOCUMENTS

TW            M377163 U1      4/2010

*Primary Examiner* — Beth A Stephan
(74) *Attorney, Agent, or Firm* — Rosenberg, Klein & Lee

(57) ABSTRACT

A safety device for a curtain controller is provided. The safety device comprises a base, a bead chain wheel, and a cover. A shaft sleeve having a conical shape is disposed in a through hole of the base to connect a shaft's terminal and thus be fixed in a sleeving hole, having a shape to fit the shaft sleeve, of the bead chain wheel, so that the motions of the shaft sleeve and the bead chain wheel are linked. A bead chain is wound on the bead chain wheel. When the bead chain is pulled down, the shaft sleeve can drive the rotation of the bead chain wheel. The upper part of the cover is pivotally connected to the base, and the lower part of the cover buckles the base. Therefore, when the bead chain is instantly pulled down, the cover can be opened to drop the bead chain wheel.

6 Claims, 6 Drawing Sheets

(56) References Cited

U.S. PATENT DOCUMENTS

| | | | | |
|---|---|---|---|---|
| 6,585,026 B2* | 7/2003 | Su | ............................ | E06B 9/303 |
| | | | | 160/243 |
| 6,749,000 B2* | 6/2004 | Bohlen | .................... | E06B 9/322 |
| | | | | 160/178.1 R |
| 7,017,230 B2* | 3/2006 | Lin | ......................... | E06B 9/262 |
| | | | | 16/202 |
| 8,336,598 B1* | 12/2012 | Chang | ....................... | E06B 9/56 |
| | | | | 160/177 V |
| 2011/0247768 A1* | 10/2011 | Kwak | ..................... | E06B 9/326 |
| | | | | 160/319 |
| 2012/0017399 A1* | 1/2012 | Huang | .................... | E06B 9/326 |
| | | | | 24/115 F |
| 2013/0056164 A1* | 3/2013 | Kawai | ..................... | E06B 9/262 |
| | | | | 160/321 |
| 2013/0068405 A1* | 3/2013 | Lava | ....................... | E06B 9/326 |
| | | | | 160/321 |
| 2013/0081494 A1* | 4/2013 | Klein Tuente | .......... | F16H 35/00 |
| | | | | 74/411 |

* cited by examiner

SAFETY DEVICE FOR CURTAIN CONTROLLER

BACKGROUND

Field of Invention

The disclosure relates to a safety device for a curtain controller. More particularly, the disclosure relates to a safety device for a curtain controller that can drop the bead chain wheel and the bead chain from the curtain controller when it is overloaded to prevent a child's neck wound by the bead chain of the curtain controller.

Description of Related Art

A conventional curtain controller has a base, a bead chain wheel and a cover. The base has a central hole penetrated by a shaft. A is terminal end of the shaft is fixed on the bead chain wheel wound by a bead chain. The cover is fixed on a lateral side of the base by screws to cover the bead chain wheel and a portion of the bead chain.

When the bead chain is pulled, the bead chain can drive the bead chain wheel to rotate forward or reversely, and then to forward or reversely rotate the shaft to control the opening or closure of the curtains in a vertical or horizontal direction.

Taiwan Model Patent No. M377163U1 discloses an improved structure of a labor-saving curtain bead chain controller. The improved controller comprises a base, and an accommodating space is concavely disposed in the base. A central shaft is extended from the central portion of the base and sleeved by a bearing part. A peripheral surface of a tooth plate has several tooth trenches and is provided with a control rope. A linking rod is disposed on one side of the tooth plate with several tooth slots, and a concave slot is disposed on the other side of the tooth plate. A linking part sleeves the linking rod extended from the tooth plate set, and an accommodating trench is disposed on one side of the linking part. The central shaft of the base penetrates and is sleeved by the bearing part. The concave slot on one side of the tooth plate coordinates to sleeve the bearing part. The linking rod on the other side of the tooth plate is sleeved with the linking part through the accommodating trench.

However, no matter the curtain controller in the TW M377163U or a conventional curtain controller, the bead chain has high strength and toughness. Therefore, when the neck of a child or a user is wound by the bead chain, it may cause an asphyxia problem because the user cannot be released from the bead chain. Thus, the child or the user may be harmed.

SUMMARY

In light of the drawbacks above, a safety device for a curtain controller is developed to prevent the danger that a neck of a user is wound by the bead chain of a curtain controller but cannot be released from the bead chain.

One aspect of this invention is to provide a safety device for a curtain controller. This safety device can automatically drop the bead chain wheel from the curtain controller caused by the overweight carried by the curtain controller. Therefore, when a user's neck is wound by the bead chain of the curtain controller, the dropped bead chain wheel can release the user's neck and thus protect the user's safety.

The safety device for a curtain controller comprises a base having a through hole; a shaft sleeve disposed in the through hole to fixedly connect a terminal end of a shaft; a sleeve shaft disposed on a surface, opposite to the shaft, of the shaft sleeve, wherein a diameter of the sleeved shaft is decreased along a direction away from the shaft to form a tapered cylinder having a first inclined surface; at least one inserted slot disposed on the first inclined surface; a first buckle part disposed on a bottom part of the base;

a bead chain wheel having a plurality of equiangularly disposed concave holes for accommodating beads of a bead chain; a sleeving hole disposed on a surface, facing the shaft sleeve 12, of the bead chain wheel, wherein a diameter of the sleeving hole fits the diameter of the sleeved shaft, so that a peripheral wall of the sleeving hole forms an oblique cone to have a second inclined surface to fit the first inclined surface; at least one inserting block disposed on the second inclined surface of the sleeving hole to be corresponding to the at least one inserted slot; a central bump disposed on a central shaft of the bead chain wheel;

a cover, wherein an upper part of the cover pivotally connects to an upper part of the base; a second buckle part disposed on a lower part of the cover to correspondingly buckle the first buckle part; and a central concave hole disposed on an inner wall, facing the bead chain wheel, of the cover, wherein the central concave hole is corresponding to and against to connect the central bump.

The sleeving hole of the bead chain wheel sleeves the sleeved shaft of the shaft sleeve in the through hole of the base, and the second buckle part of the cover buckles the first buckle part of the base to complete the assembling of the safety device for a curtain controller, which can prevent a neck of a child or a user from being wound by the bead chain.

Accordingly, when the bead chain is instantly pulled down and the force is over the permitted weight carrying capacity, such as the weight of a child as the neck of the child is wound by the bead chain, the bead chain wheel cannot be rotated, since both sides of the bead chain are heavily pulled down. In addition, the sleeving hole of the bead chain wheel and the sleeved shaft of the shaft sleeve are contacted by the conically disposed first and second inclined surfaces, the bead chain wheel will move outward. When the pushing force of the bead chain wheel is over the buckling force between the cover and the base, the lower part of the cover can be released from the buckled state, so that the bead chain wheel can escape from the shaft sleeve laterally and thus drop the bead chain wheel and the bead chain from the base. Therefore, the dangerous asphyxia condition caused by wound neck of a child or a user can be prevented to ensure the safety of a child or a user.

DETAILED DESCRIPTION

Figure 1:
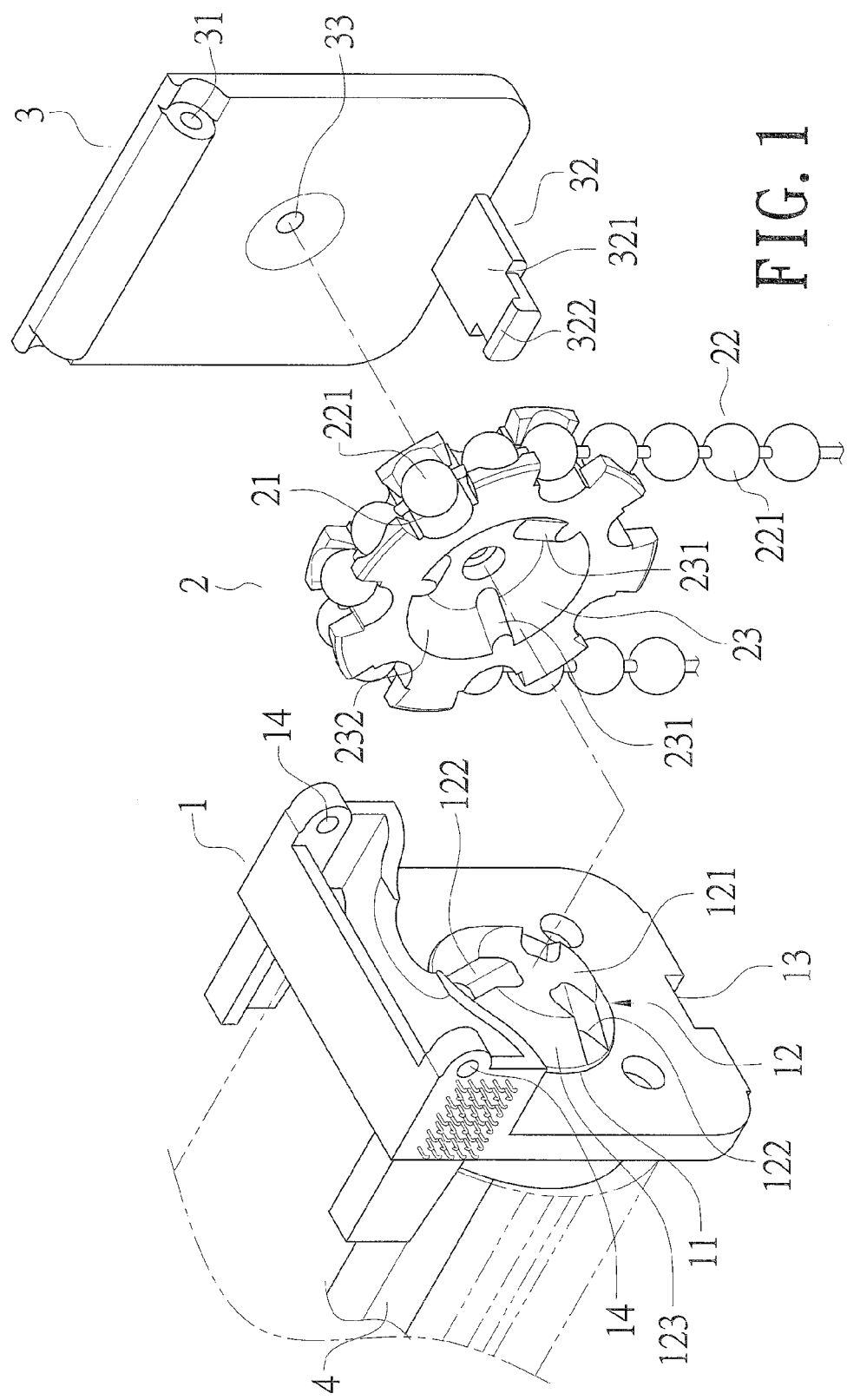
FIG. 1 is a perspective explosive diagram of a safety device for a curtain controller according to this invention.
Figure 2:
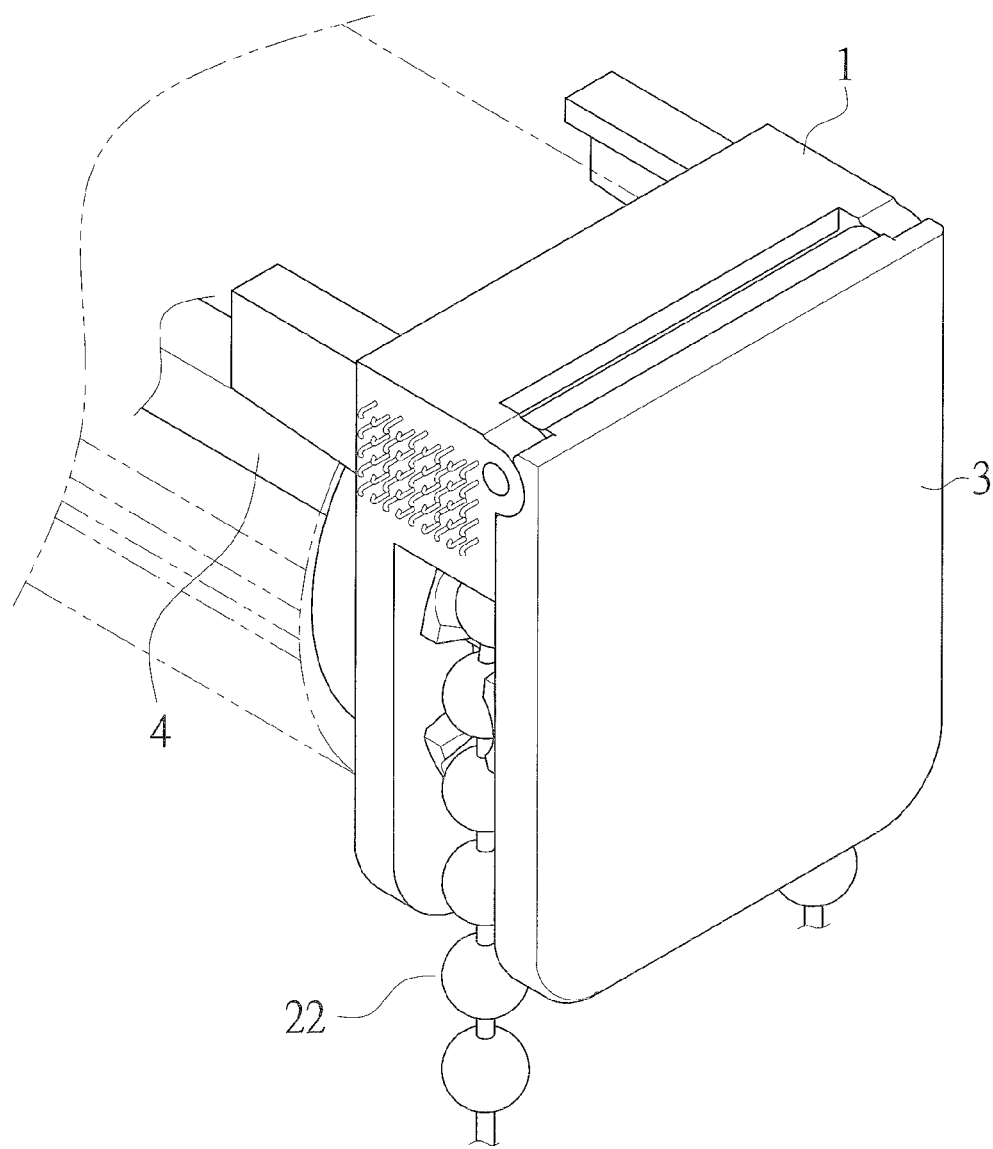
FIG. 2 is a perspective assembled diagram of a safety device for a curtain controller according to this invention.
Figure 3:
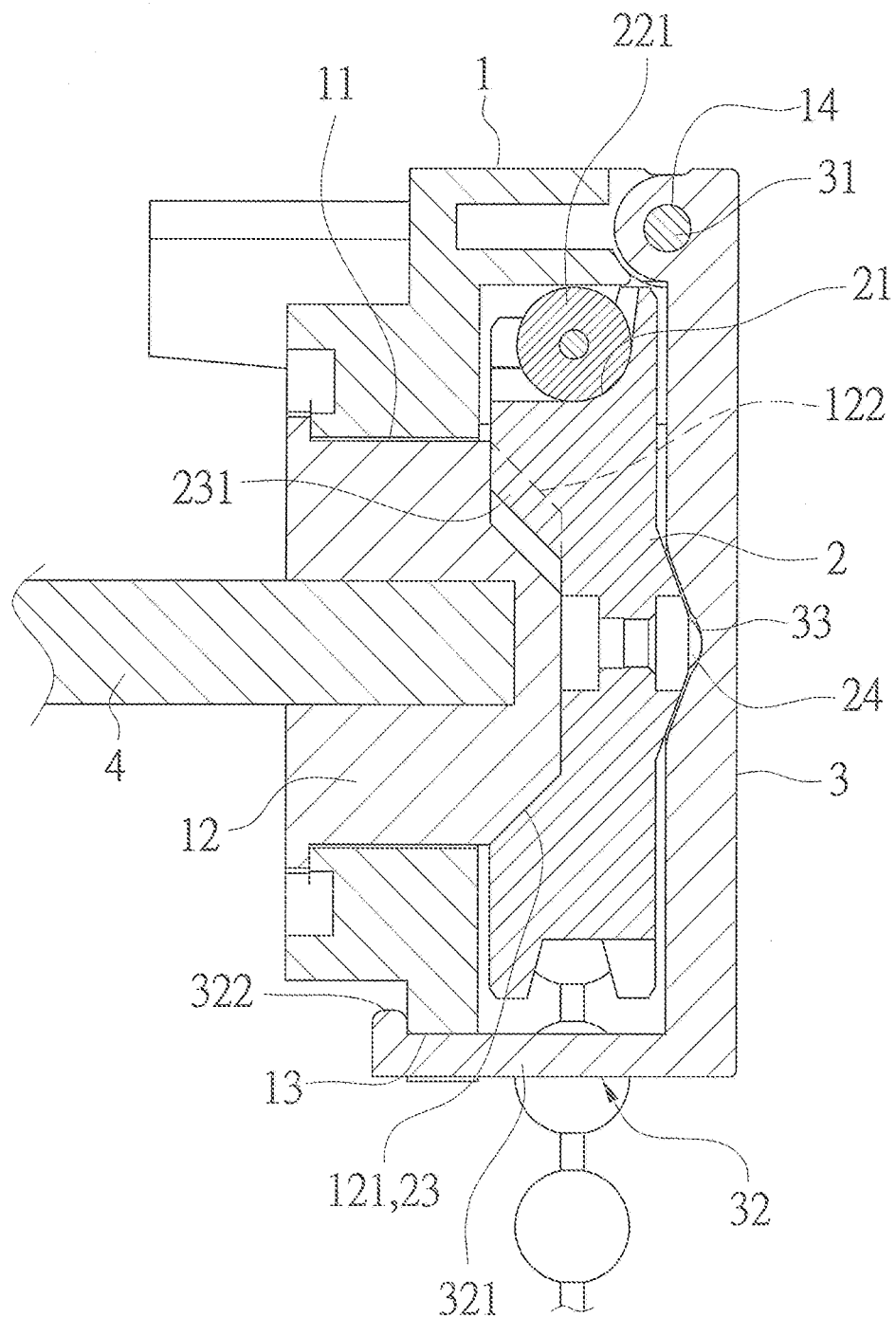
FIG. 3 is a cross-sectional assembled diagram of a safety device for a curtain controller according to this invention.

Please refer to FIGS. 1-3.

This invention provides a safety device for a curtain controller, which comprises a base 1, a bead chain wheel 2, and a cover 3.

The base 1 has a through hole 11, and a shaft sleeve 12 in the through hole 11 is used to fixedly connect a terminal end of a shaft 4. A sleeved shaft 121 is disposed on a surface, opposite to the shaft 4, of the shaft sleeve 12. The diameter of the sleeved shaft 121 is decreased along the direction away from the shaft 4, and the sleeved shaft 121 thus becomes to be a tapered cylinder. That is, the peripheral surface of the sleeved shaft 121 is contoured substantially similar to an oblique cone having a first inclined surface 123. At least one inserted slot 122 is disposed on the first inclined surface 123. In the figures of the disclosure, there are three inserted slots 122 equiangularly disposed on the first inclined surface 123. A first buckle part 13 is disposed on the bottom part of the base 1.

There are several concave holes 21 equiangularly disposed on the bead chain wheel 2, and these concave holes 21 are provided to accommodate beads 221 of a bead chain 22. A sleeving hole 23 is disposed on a surface, facing the shaft sleeve 12, of the bead chain wheel 2. The diameter of the sleeving hole 23 fits the diameter of the sleeved shaft 121. Therefore, the peripheral wall of the sleeving hole 23 is also like an oblique cone to form a second inclined surface 232 to fit the first inclined surface 123, so that the sleeving hole 23 can sleeve the sleeved shaft 121. At least an inserting block 231 is disposed on the second inclined surface 232 of the sleeving hole 23 to be corresponding to the inserted slot 122. In the figures of the disclosure, three inserting blocks 231 are equiangularly disposed on the second inclined surface 232 to be correspondingly inserted in to the inserted slots 122. A central bump 24 is disposed on the central shaft of the bead chain wheel 2 to be pointed away from the sleeving hole 23.

The cover 3 is disposed on a lateral side of the base 1 to cover the bead chain wheel 2 and a portion of the bead chain 22. The upper edge of the cover 3 is pivotally connected to the upper edge of the base 1. In the disclosed figures, pivot holes 14 are disposed on two upper side walls of the base 1. Pivots 31 are disposed on two sides of the upper edge of the cover 3 to be correspondingly inserted into the pivot holes 14, so that is the upper edge of the cover 3 is pivotally assembled with the upper part of the base 1. A second buckle part 32 is disposed on the lower part of the cover 3 to correspondingly buckle the first buckle part 13. A central concave hole 33 is disposed on the inner wall, facing the bead chain wheel 2, of the cover 3. The central concave hole 33 is corresponding to the central bump 24 to be inserted and against by the central bump 24.

Please refer to FIGS. 2 and 3. When the parts above are assembled, one terminal of the shaft 4 is fixed in the shaft sleeve 12. The shaft sleeve 12 is then disposed in and penetrates the through hole 11 of the base 1, and the sleeved shaft 121 having the first inclined surface 123 is protruded from the through hole 11 to be sleeved in the sleeving hole 23. At the same time, the second inclined surface 232 of the sleeving hole 23 and the first inclined surface 123 of the sleeved shaft 121 are matched to each other, as well as the inserting block 231 is inserted into the inserted slot 122 having the first inclined surface 123. Hence, linked transmission relationships are formed between the bead chain wheel 2 and the shaft sleeve 12 as well as between the shaft sleeve 12 and the shaft 4. Next, the pivot 31 of the cover 3 is correspondingly inserted into the pivot hole 14 of the base 1 to pivotally connect the upper parts of the cover 3 and the base 1. The second buckle part 32 of the cover 3 correspondingly buckles with the first buckle part 13 of the base 1 to complete the assembling of the safety device for a curtain controller to prevent the neck of a child or a user from being wound by the bead chain.

In one embodiment of this invention, the first buckle part 13 is a through slot, and the second buckle part 32 includes an extending sheet 321 and a holding part 322 disposed on a terminal end of the extending sheet 321. When the second buckle part 32 of the cover 3 correspondingly buckles with the first buckle part 13 of the base 1, the extending sheet 321 is inserted into the through slot and the holding part 322 is engaged with an edge of the through slot.

Usually, the central concave hole 33 of the cover 3 is against the central bump 24 of the bead chain wheel 2. The sleeved shaft 121 in the shaft sleeve 12 on a terminal end of the shaft 4 is fitted to be sleeved into the sleeving hole 23 of the bead chain wheel 2 to well support the two sides of the bead chain wheel 2. Therefore, the bead chain wheel 2 can be stably rotated when the bead chain 22 is pulled, and the force is transmitted to the shaft 4 to control the opening and closure of the curtain.

Figure 4:
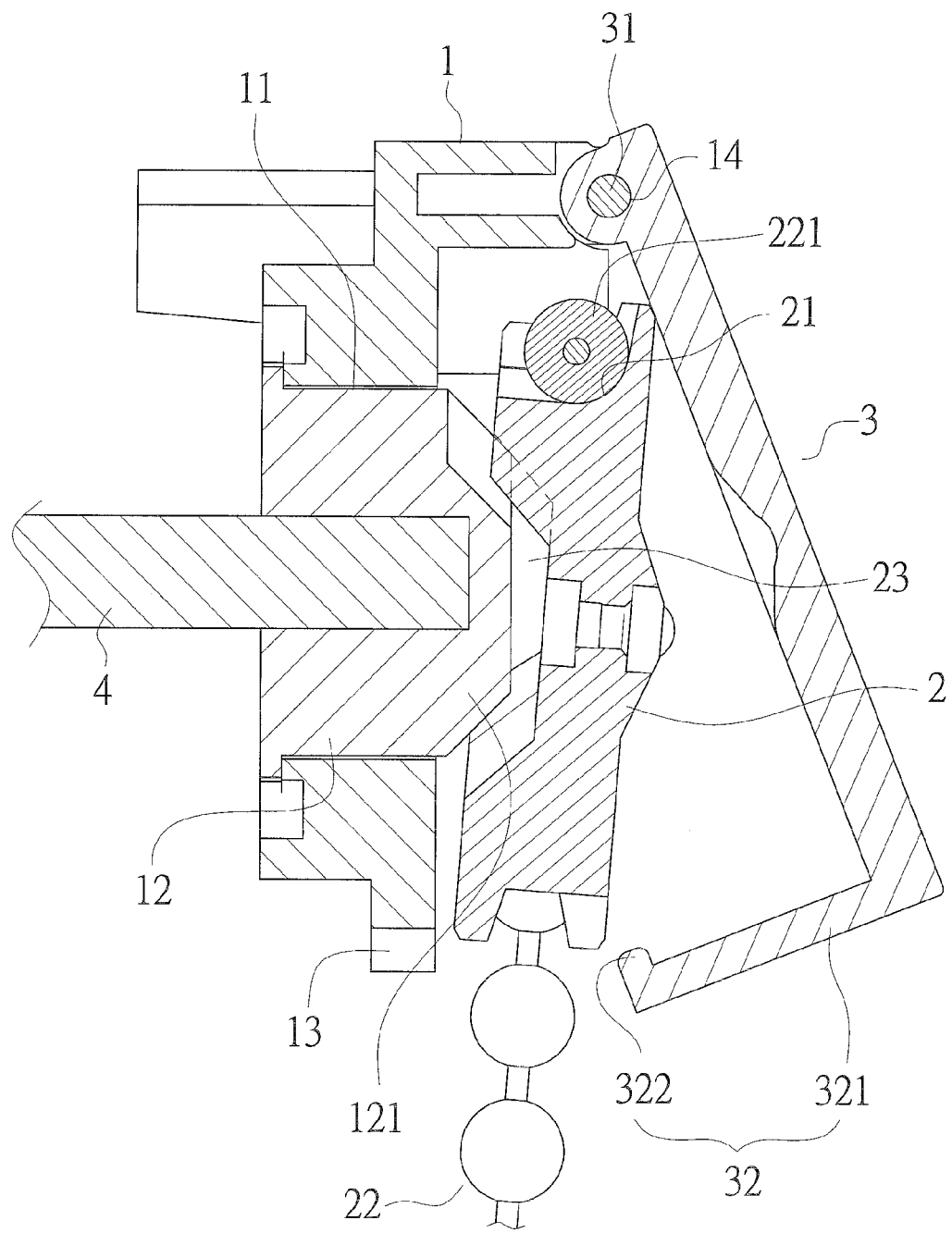
FIG. 4 is a diagram showing that the bead chain and the bead chain wheel are forced and about to escape from the curtain controller.
Figure 5:
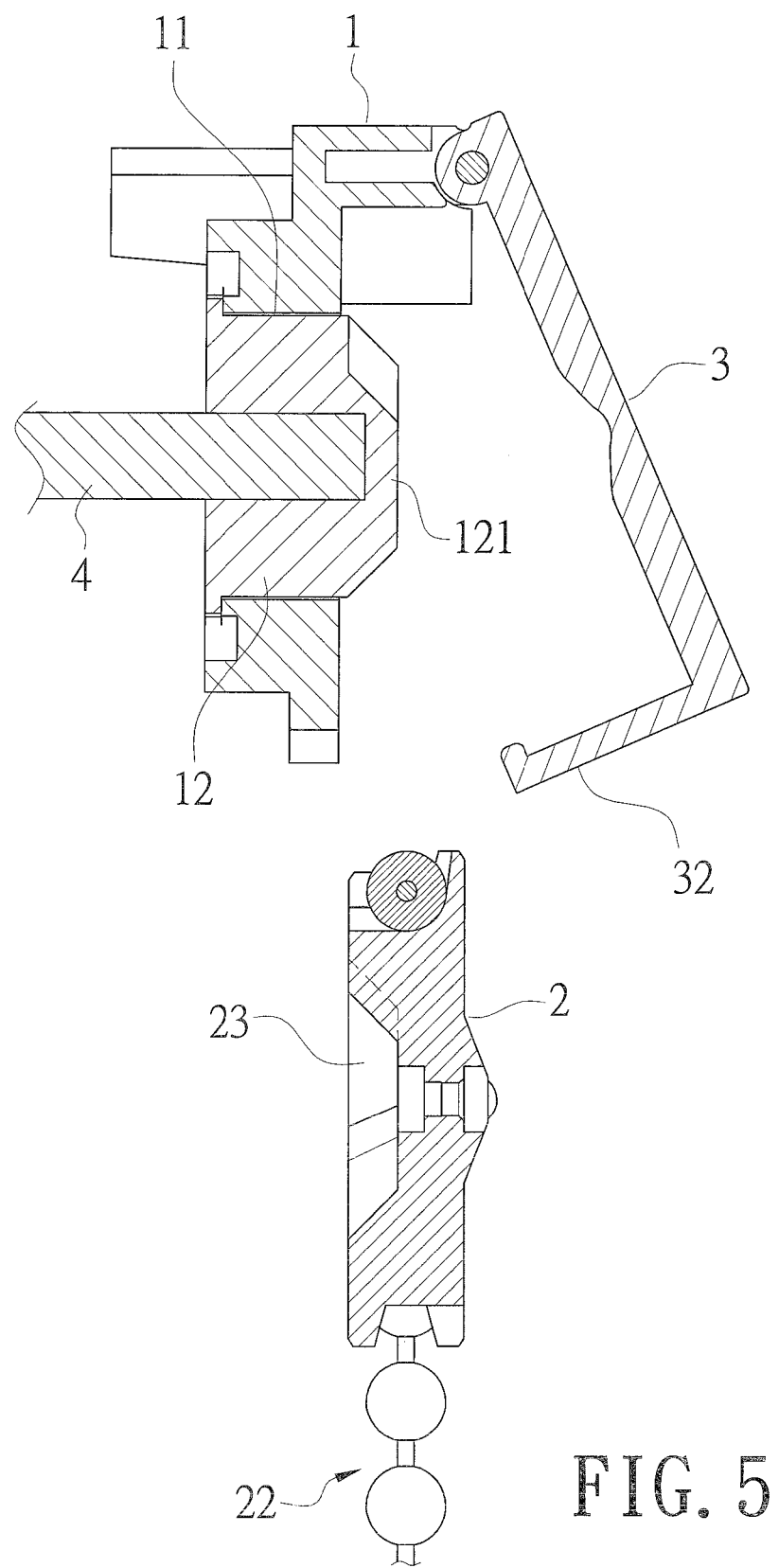
FIG. 5 is a diagram showing that the bead chain and the bead chain wheel are forced and have escaped from the curtain controller.
Figure 6:
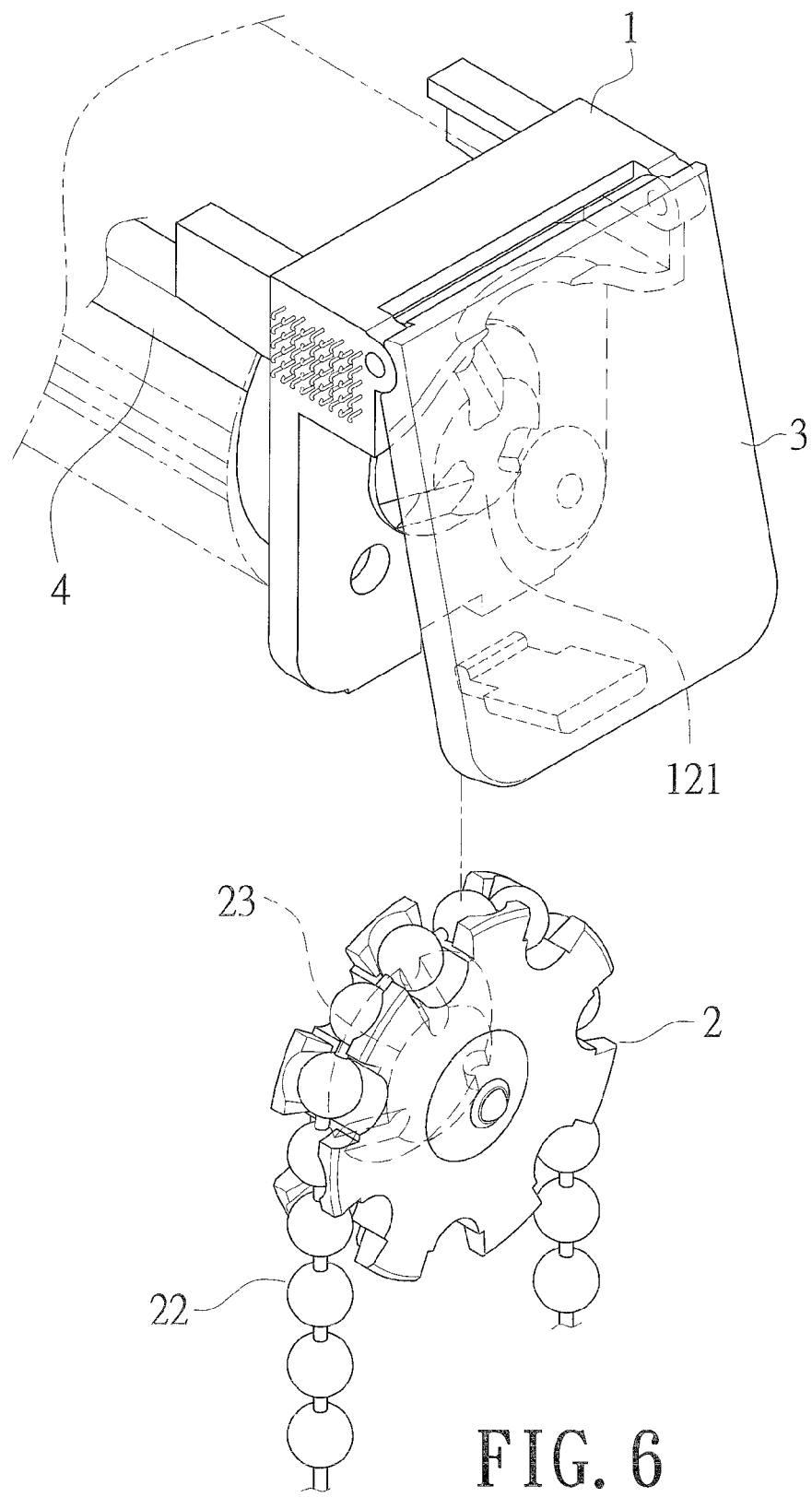
FIG. 6 is a perspective diagram showing that the bead chain and the bead chain wheel are forced and have escaped from the curtain controller.

Please refer to FIGS. 4-6. Accordingly, when the neck of a child or a user is wound by the bead chain 22, a pulling-down force will be instantly generated. At this time, since both sides of the bead chain 22 are heavily pulled down to pull down the bead chain wheel 2, the bead chain wheel 2 cannot be rotated. In addition to the conically disposed relationship between the fist inclined surface 123 of the sleeved shaft 121 of the base 1 and the second inclined surface 232 of the sleeving hole 23 of the bead chain wheel 2, the bead chain wheel 2 is pulled toward the cover 3 to push the cover 3 outwardly. When the force pushing outward is stronger than the buckling force between the first buckle part 13 of the base I and the second buckle part 32 of the cover 3, the base 1 and the cover 3 can be released from the buckled state. Furthermore, the bead chain wheel 2 will escape from the shaft sleeve 12 laterally to drop the bead chain wheel 2 and the bead chain 22 from the base 1. Therefore, although the neck of a child or a user is wound by
the bead chain 22, the child or the user still can break free from the bead chain 22 to prevent from being asphyxiated asphyxia. Therefore, the safety of the child or the used can be guaranteed.

What is claimed is:

1. A safety device for a curtain controller, comprising:
   a base having a through hole;
   a shaft sleeve disposed in the through hole and fixedly connected to a terminal end of a shaft adapted to extend from the curtain controller;
   a sleeved shaft disposed on a surface of the shaft sleeve opposite to the connection of the shaft sleeve's connection to the terminal end of the shaft, wherein a diameter of the sleeved shaft is decreased along a direction away from the shaft to form a tapered cylinder having a first inclined surface;
   at least one inserted slot disposed on the first inclined surface;
   a first buckle part disposed on a bottom part of the base;

a bead chain wheel having a plurality of equiangularly disposed concave holes for accommodating beads of a bead chain;

a sleeving hole disposed on a surface of the bead chain wheel and facing the shaft sleeve, wherein a diameter of the sleeving hole fits the diameter of the sleeved shaft, a peripheral wall of the sleeving hole forming an oblique cone and having a second inclined surface to fit the first inclined surface;

at least one inserting block disposed on the second inclined surface of the sleeving hole to be corresponding to the at least one inserted slot;

a central bump disposed on a central shaft of the bead chain wheel;

a cover, wherein an upper part of the cover pivotally connects to an upper part of the base;

a second buckle part disposed on a lower part of the cover to correspondingly buckle with the first buckle part; and a central concave hole disposed on an inner wall of the cover facing the bead chain wheel, wherein the central concave hole is disposed in correspondence with and in contact with the central bump, wherein the sleeving hole of the bead chain wheel sleeves with the sleeved shaft of the shaft sleeve in the through hole of the base, and the second buckle part of the cover buckles with the first buckle part of the base for assembling of the safety device to prevent a neck of a user from being wound by the bead chain.

2. The safety device of claim 1, wherein the first buckle part is a through slot and the second buckle part includes an extending sheet and a holding part disposed on a terminal end of the extending sheet, and the extending sheet being inserted into the through slot for the holding part to be engaged with an edge of the through slot.

3. The safety device of claim 2, wherein a number of the at least one inserted slot and a number of the at least one inserting block are three.

4. The safety device of claim 3, wherein the inserted slots and the inserting blocks are all equiangularly disposed.

5. The safety device of claim 1, wherein a number of the at least one inserted slot and a number of the at least one inserting block are three.

6. The safety device of claim 5, wherein the inserted slots and the inserting blocks are all equiangularly disposed.

* * * * *